Figure 1:
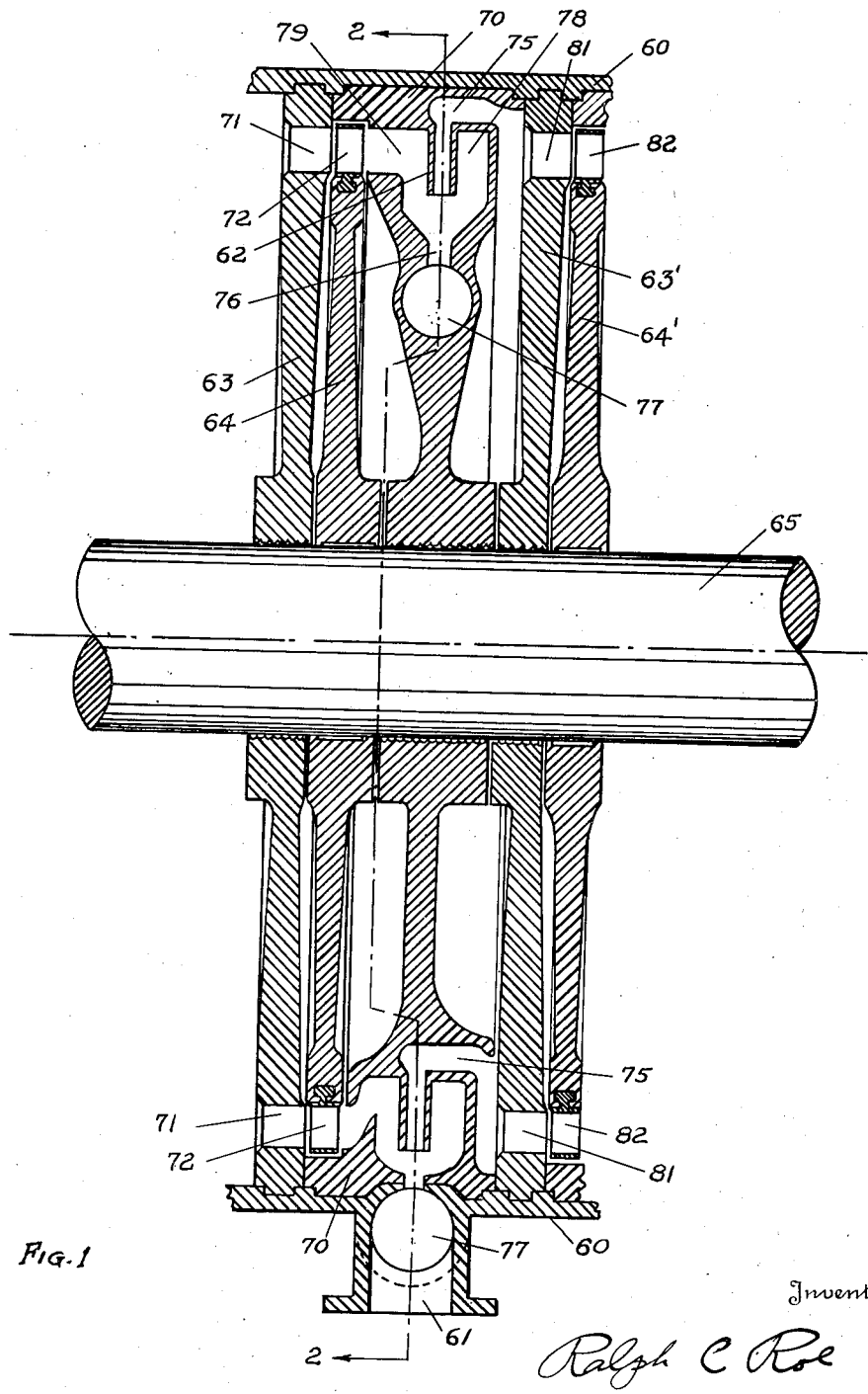

Aug. 4, 1942.   R. C. ROE   2,292,291
STEAM TURBINE PLANT
Filed Jan. 8, 1940   5 Sheets-Sheet 1

Inventor
Ralph C Roe

Aug. 4, 1942.          R. C. ROE          2,292,291
STEAM TURBINE PLANT
Filed Jan. 8, 1940          5 Sheets-Sheet 3

Inventor
Ralph C. Roe

Patented ... , 1942

2,292,291

UNITED STATES PATENT OFFICE 2,292,291

STEAM TURBINE PLANT

Ralph C. Roe, Englewood, N. J., assignor of one-half to Stephen W. Borden, Summit, N. J.

Application January 8, 1940, Serial No. 312,953

2 Claims. (Cl. 60—102)

This invention pertains to steam turbines and steam turbine plants and more especially to steam turbines designed for operation with saturated steam and wherein the steam is dried interstage by means of mechanical steam driers and combinations of such turbines with other types of turbines and/or equipment in steam turbine plants.

One object of the invention is to provide a steam turbine power plant having as high efficiency as is at present attainable with very high pressure, high temperature steam while employing relatively lower temperatures and little or even no superheat, for a considerable portion of the steam supply thus greatly reducing the superheating equipment in the boilers which of course is a very great advantage especially where high pressures and temperatures are involved. Another object is to provide a power plant wherein high pressure and high temperature steam may be advantageously used in a multistage turbine in which at least the high temperature portion of the turbine casing has no extraction steam outlets to aggrevate the difficulties from metal distortion.

These results are accomplished, in part, by using means for extracting the moisture from wet steam, preferably at a multiplicity of points along the steam path as it flows through the turbine. The points where the steam is diverted through the driers are utilized also as the extraction points for feed water heating and the separated moisture flows along with the extracted steam into feed water heaters.

The driers illustrated herein consist of a multiplicity of individual driers or separators working in multiple and in order to differentiate I term a single drying unit a "separator" or "separating unit" and a multiplicity of separators arranged in multiple a "drier." As used herein the term "drying device" is to be understood as either a single separator or a multiplicity of separators grouped to form a drier and a device which is in addition thereto and contains no portion of the rotor of any steam turbine with which it is associated. I have shown a multiplicity of separators operating in multiple because a multiplicity of small diameter separators is more effective in separating the moisture from the steam than is a single separator having necessarily a much greater diameter to accommodate the same total steam flow. This is due to the fact that in the smaller diameter separators the steam stream in circulating within the separator changes its direction of flow much more rapidly than it does in a separator of greater diameter and the separating effect, other things being equal, is proportional to the rate of change of direction of the steam. I prefer to use the type of separator described in my U. S. Patent No. 2,262,860, issued November 18, 1941, which is capable of producing substantially 100% dry and saturated steam for turbine use while discharging the separated moisture and any steam may still contain moisture into the feed water heater.

The term "wet turbine" and "wet portion" are used herein to designate a turbine or a portion of a turbine intended for use only with non-superheated steam.

Figure 2:
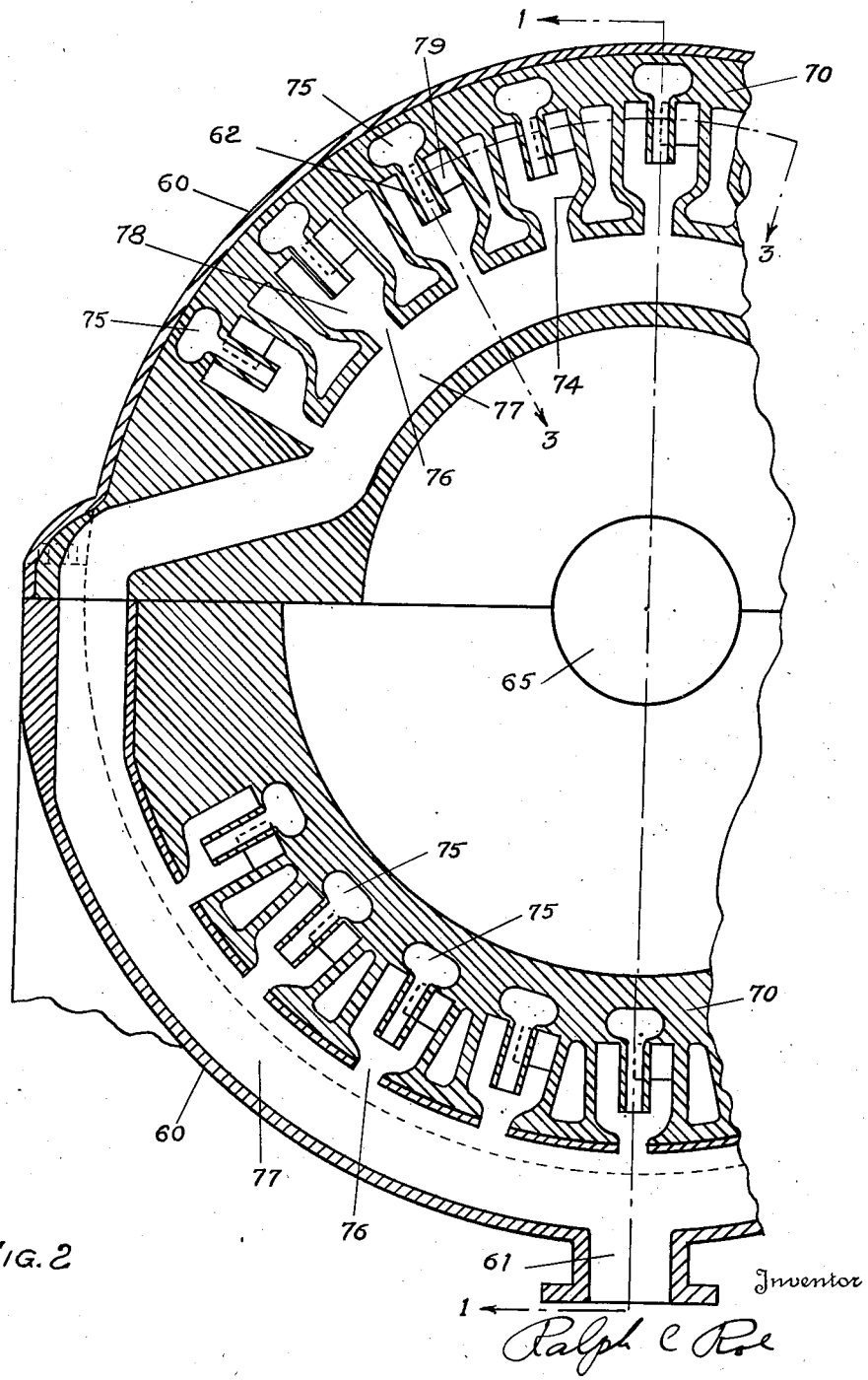
Figure 3:
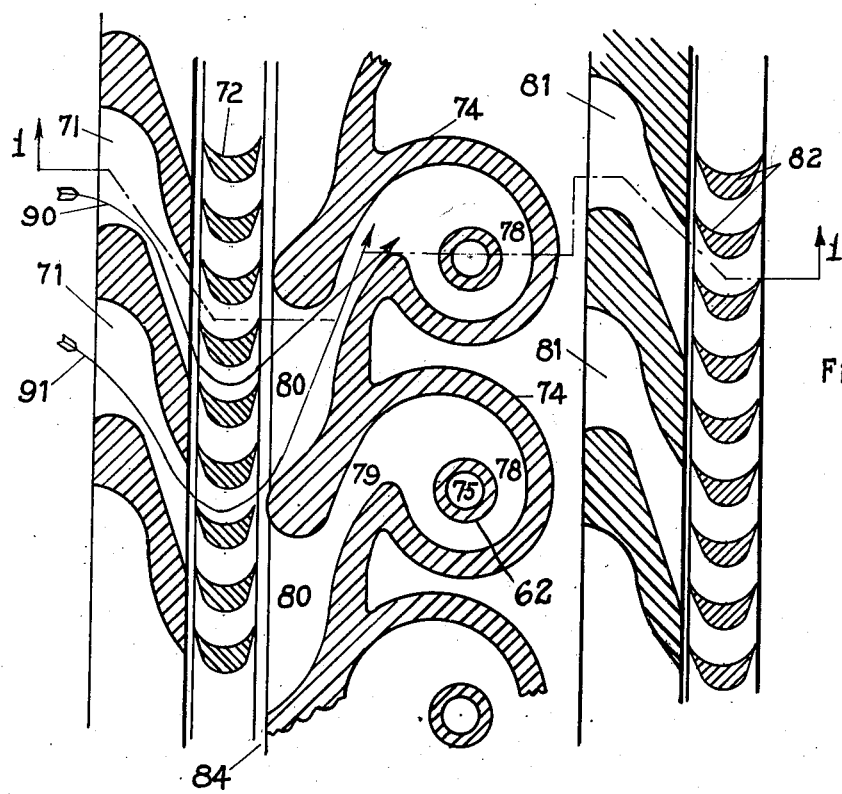
Figure 4:
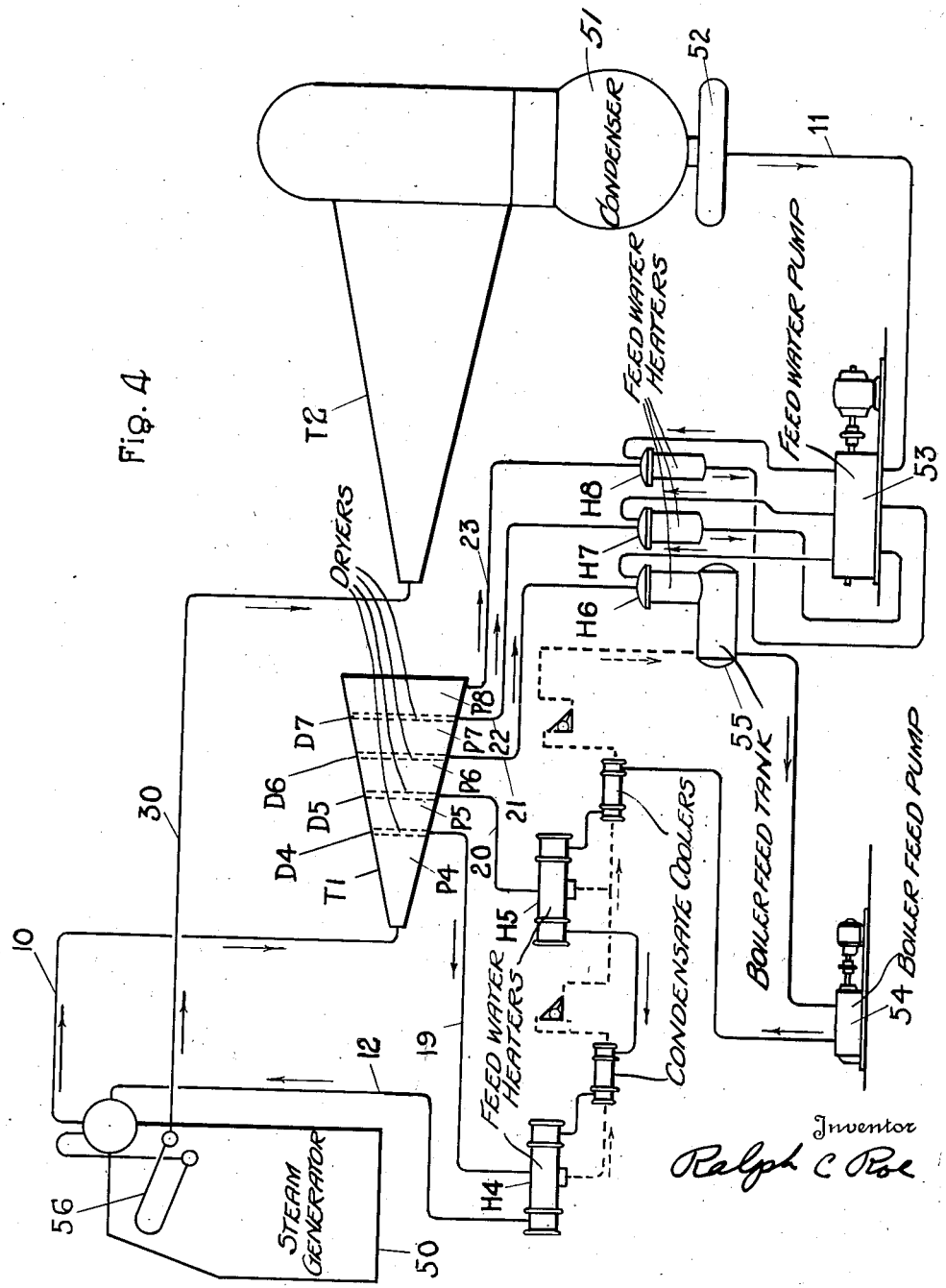
Figure 5:
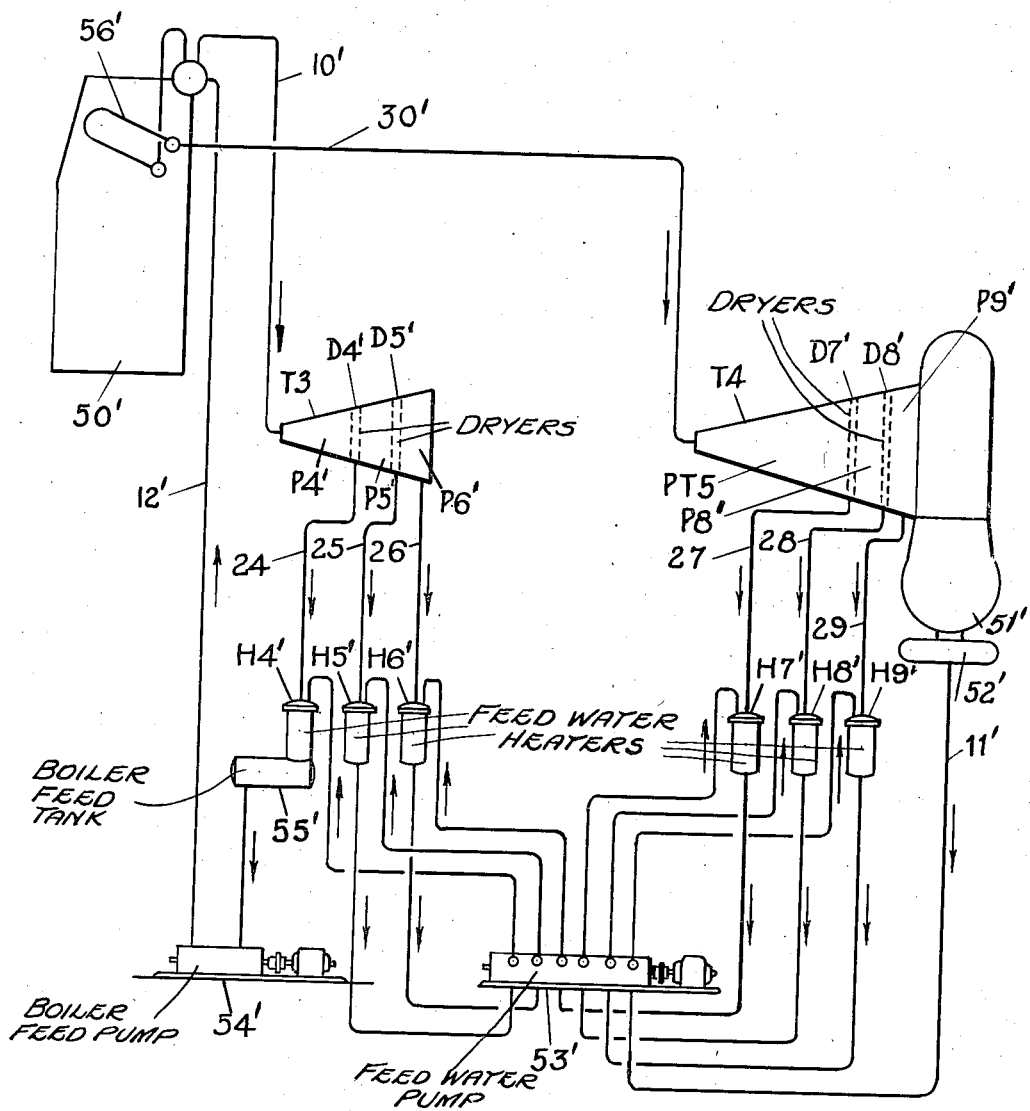

In the drawings: Figs. 1, 2, and 3, are various views of a dryer installed within a turbine casing and between two stages of the turbine. Fig. 4 is a steam turbine plant illustrating the combination of a wet turbine with a dry turbine. Fig. 5 is a steam turbine plant illustrating the combination of a wet turbine with a combination dry and wet turbine.

Referring now to the drawings, Figs. 1, 2 and 3; Fig. 1 is a vertical cross-section, on line 1—1 of Fig. 3, of a portion of a multi-stage steam turbine having a steam drying device positioned between two stages of the turbine. Fig. 2 is a section on line 2—2 of Fig. 1 and Fig. 3 is a section on line 3—3 of Fig. 2 enlarged. In each of the figures 60 is the casing of the turbine, 71 and 81 are conventional turbine nozzles attached to disks as 63 and 63' which are installed in the casing 60. 72 and 82 are conventional revolving turbine buckets attached to disks as 64 and 64', which in turn are secured to shaft 65 and revolve with it. 70 is an additional disk which also is installed in the turbine casing 60 and this disk contains, as best shown by Fig. 2, a multiplicity of steam separators, connected in multiple, the particular disk illustrated containing 18 such separators. The disks 63, 63' and 70 are stationary and do not touch shaft 65 but are usually separated from it by labyrinth packing or the equivalent.

Steam flowing through the turbine passes through the stationary nozzles 71 thence through the revolving buckets 72 and thence via passage 80 into and through nozzles 79 to the separating chambers 78 of the various separators. Dry steam leaves the separating chamber via the central ducts 62 and passages 75 and thence through nozzles 81 and revolving buckets 82. The moisture extracted from the steam in chambers 78 flows out through passages 76 into the passageway 77 from which it flows by gravity through the outlet 61 which may be conveniently connected to a feed water heater.

The individual separator units are substantially more fully set forth in my Patent No. 2,262,860, and when used as shown, practically avoid all end losses between the turbine buckets and the separators since the leaving velocity of the turbine blades become the entrance velocity in nozzle 79. As more fully set forth in the patent, the pressure energy in the steam is converted, in nozzle 79, into velocity energy which in turn produces a high velocity in chamber 78, the effect of which is further enhanced by the relatively small diameter of chamber 78, a combination of the two producing a very powerful separating action.

Referring now to Fig. 4. 50 is a steam generator which includes a superheater 56. Steam from the superheater flows through conduit 30 to turbine T2 which exhausts into condenser 51. Condensate from hot well 52 flows through conduit 11 to and through a section of feedwater pump 53, thence through heater H8, thence through another section of the feed pump and thence through heater H7 and thence through another section of the feed pump to heater H6 and thence to boiler feed tank 55 from which it flows to the boiler feed pump 54 which in turn pumps feedwater through heaters H5 and H4 back to generator 50 via conduit 12.

Saturated steam flows via conduit 10 to the wet turbine T1. The dryers D4, D5, D6, and D7 are positioned in turbine T1 and between different stages of the turbine as P4, P5, P6, P7 and P8 in the manner shown in Figures 1, 2 and 3. As the steam flows through the turbine the dryers extract the moisture from the steam and this moisture, plus whatever additional steam is called for by the feedwater heaters, flows through conduits 19, 20, 21, 22, and 23 to the feedwater heaters H4, H5, H6, H7 and H8 respectively.

The turbine T2 operates on highly superheated steam but because of the absence of steam extraction outlets its construction is greatly facilitated. Since turbine T1 does not have to handle superheated steam its construction presents no difficulties from metal distortion.

So far as the feedwater system is concerned it may be any suitable system known in the art and reference is made to my U. S. Patents Nos. 1,839,121; 1,857,332; 1,932,484; 1,932,485 and 1,932,488. While I prefer to use contact heaters it is entirely feasible and sometimes desirable that one or more of the heaters be of the closed types, as heaters H4 and H5 of Fig. 4, but the use of these closed type heaters, rather than surface type heaters such as H6, has no significance so far as this application is concerned and the heaters H4 and H5, together with their condensate coolers, could be replaced with heaters similar to H6 without materially affecting this application.

Referring now to Fig. 5, 50' is a steam generator which includes a superheater 56'. Superheated steam flows through conduit 30' to turbine T4. The portion PT5 of turbine T4 is designed for high temperature superheated steam while the portion adjacent to condenser 51' may be designed for non-superheated steam and this latter portion is referred to as the "wet portion" of the turbine. Within the wet portion of the turbine and between portions PT5 and P8' there is installed a dryer D7' and between portions P8' and P9' is installed a dryer D8'. Dryer D7' is connected via conduit 27 to heater H7', dryer D8' is connected via conduit 28 to feedwater heater H8' and steam conduit is extracted from portion P9' and led through conduit 29 to heater H9'. The condensate from condenser 51' flows into hot well 52' and thence through conduit 11' to the feedwater pump 53' after which it passes successively through feedwater heaters H9', H8', H7', H6', H5', H4' to the boiler feed tank 55'. There is of course a section of the feedwater pump 53' interposed ahead of each of the heaters. Boiler feed pump 54' obtains its supply from boiler feed tank 55' and pumps it through conduit 12' back to steam generator 50'.

Saturated steam flows through conduit 10' to turbine T3. In turbine T3 a dryer D4' is interposed between sections P4' and P5' and dryer D5' is interposed between sections P5' and P6'. The steam after flowing through the various turbine stages and including the dryers D4' and D5' is finally exhausted through conduit 26 into heater H6'. Dryer D4' is connected via conduit 24 to heater H4' and dryer D5' is connected via conduit 25 to heater H5'.

The portion PT5 of turbine T4 operates on highly superheated steam but because of the absence of steam extraction outlets its construction is greatly facilitated. The wet portion of turbine T4 and all of turbine T3 do not have to handle superheated steam and the construction of these elements presents no difficulties so far as metal distortion is concerned. The dryers D4' and D5' are positioned in turbine T3 and between different stages of the turbine as P4', P5', P6 and the dryers D7' and D8' are positioned in turbine T4 between turbine portions PT5, P8' and P9' in the manner shown in Figs. 1, 2, and 3.

What I claim is:

1. The combination of a steam generator including a superheater element, a turbine having an inlet for receiving superheated steam from the generator, said turbine having a relatively high pressure, high temperature portion adjacent to the steam inlet, said portion being housed in a casing having no steam extraction outlets for feeding feed water heaters, a condenser connected to receive exhaust steam from the turbine for condensing the same; a wet turbine for receiving saturated steam from the steam generator, the wet turbine being provided with a multiplicity of interstage steam drying devices for extracting water from the steam independently of the centrifugal force produced by the turbine rotor, each of which is connected to a feed water heater, a feed water heater for connection to each of the devices, a feed water heater for connection to the wet turbine exhaust to receive steam therefrom, pumping means for pumping the condensate from the condenser and the fluid received by the heaters from the devices through the heaters successively in the order of ascending pressures and into the generator and interconnecting conduits between the steam generator and the turbine, between the devices and their respective heaters, between the condenser and the pumping means, and between the pumping means and the heaters, and between the pumping means and the steam generator.

2. The combination of a steam generator including a superheater element, a turbine having an inlet for receiving superheated steam from the generator, said turbine having a relatively high pressure, high temperature dry portion adjacent to the steam inlet, said portion being housed in a casing having no steam extraction outlets for feeding feed water heaters and a wet portion adjacent to the dry portion for steam of lower temperature and pressures, said portion being housed in a casing having steam extraction points for supplying steam to feed water heaters, a condenser connected to receive exhaust steam from the wet portion of the turbine for condensing the same, at least one steam drying device, for extracting water from the steam independently of the centrifugal force produced by the turbine rotor, interposed in the steam flow stream of the wet portion to receive all of the steam from one stage of the turbine and connected to a feed water heater; a wet turbine for receiving saturated steam from the steam generator the wet turbine being provided with at least one interstage steam drying device for extracting water from the steam independently of the centrifugal force produced by the turbine rotor and connected to a feed water heater, a feed water heater connected to receive the exhaust steam from the last stage of the turbine, and pumping means for pumping the condensate from the condenser and the fluid received by the heaters from the devices through the heaters successively in the order of ascending pressures and into the generator and interconnecting conduits between the steam generator and the turbines, between the devices and their respective heaters, between the condenser and the pumping means, between the pumping means and the heaters and between the pumping means and the steam generator.

RALPH C. ROE.